United States Patent [19]
Morris

[11] Patent Number: 4,917,313
[45] Date of Patent: Apr. 17, 1990

[54] CRUSHER FOR BATTERY CATHODES

[76] Inventor: Drew W. Morris, P.O. Box 10111, Greenville, S.C. 29603

[21] Appl. No.: 292,817

[22] Filed: Jan. 3, 1989

[51] Int. Cl.⁴ .............................................. B02C 19/14
[52] U.S. Cl. ..................................... 241/99; 100/902; 241/223
[58] Field of Search .................... 100/902; 241/101 B, 241/99, 81, 79.1, 152 R, 158, 200, 223

[56] References Cited
U.S. PATENT DOCUMENTS 4,432,279  2/1984  Swendeman .................... 100/902 X
4,458,801  7/1984  Nichols .
4,501,198  2/1985  Johansson et al. ............. 100/902 X

FOREIGN PATENT DOCUMENTS 987953  4/1976  Canada ................................ 100/902

Primary Examiner—Mark Rosenbaum
Attorney, Agent, or Firm—Bailey & Hardaway

[57] ABSTRACT

A crusher for battery electrodes having a wall, a plurality of crusher heads opposite the wall, a belt carried by the crusher heads for moving battery cathodes through the crusher, and an opening defined between the first floor and the second floor through walls discharged from crushed battery cathodes.

1 Claim, 4 Drawing Sheets

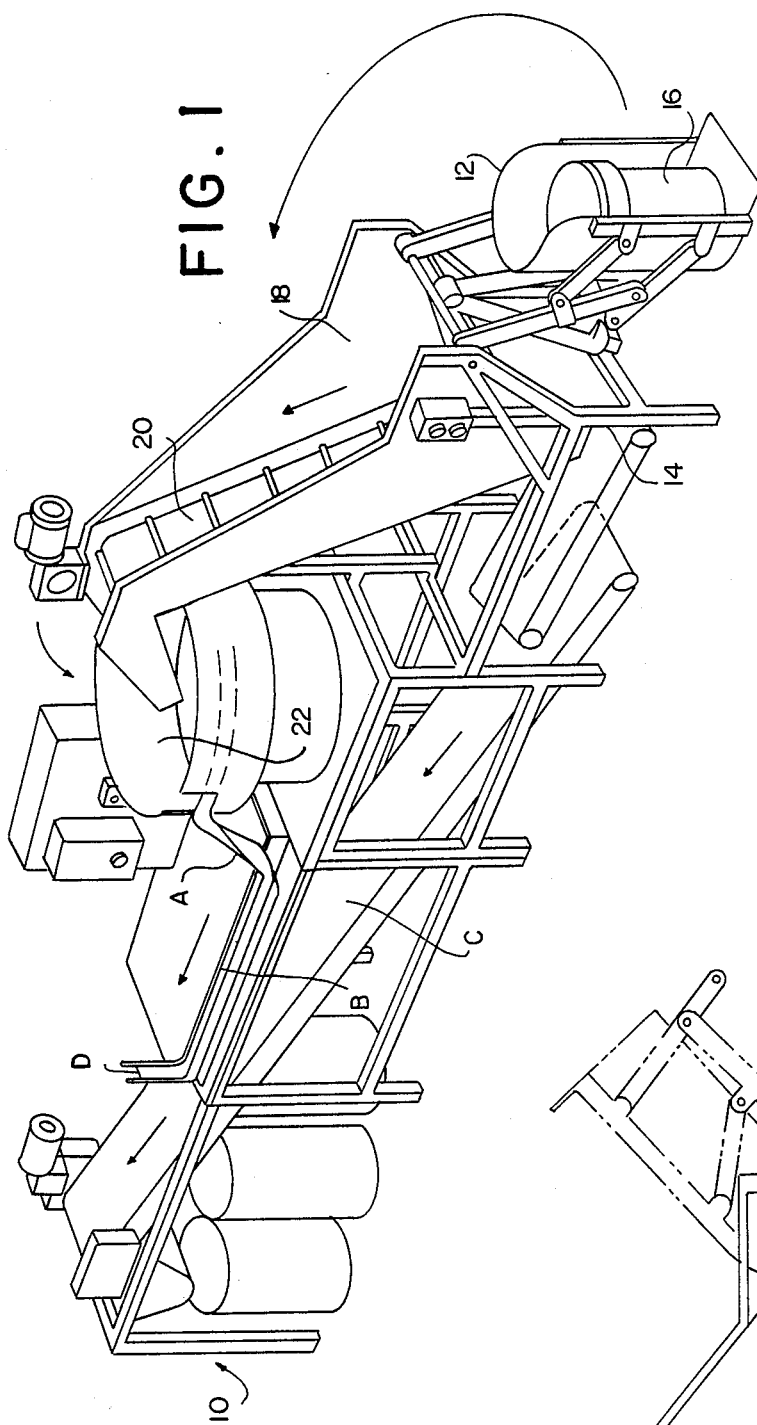
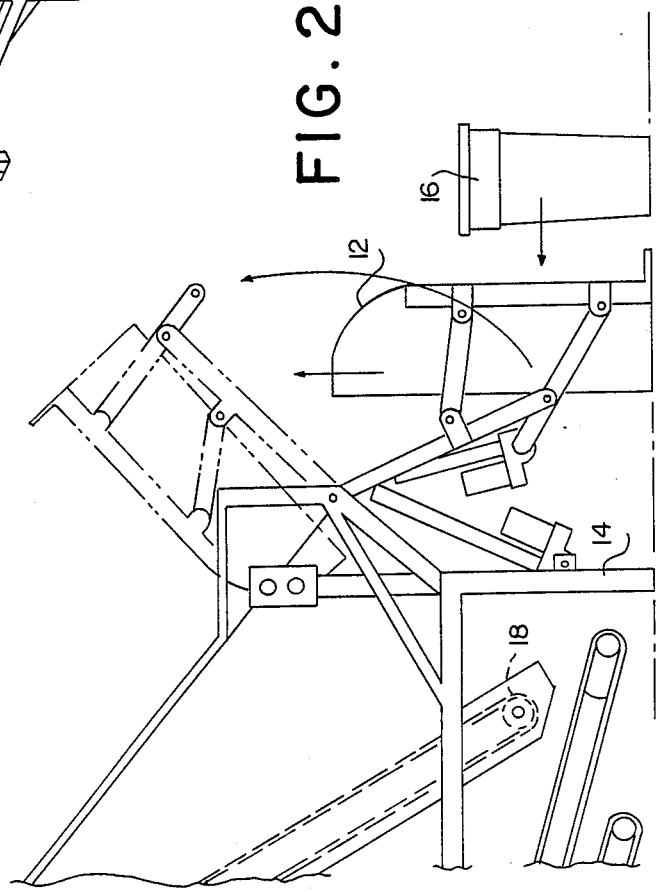

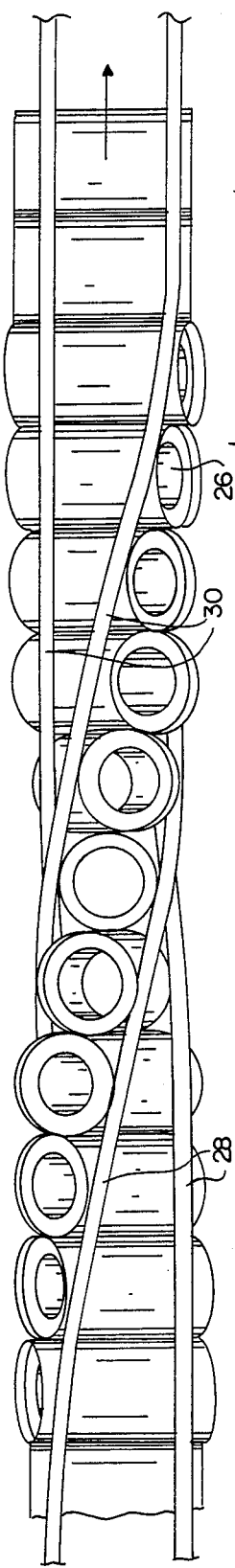
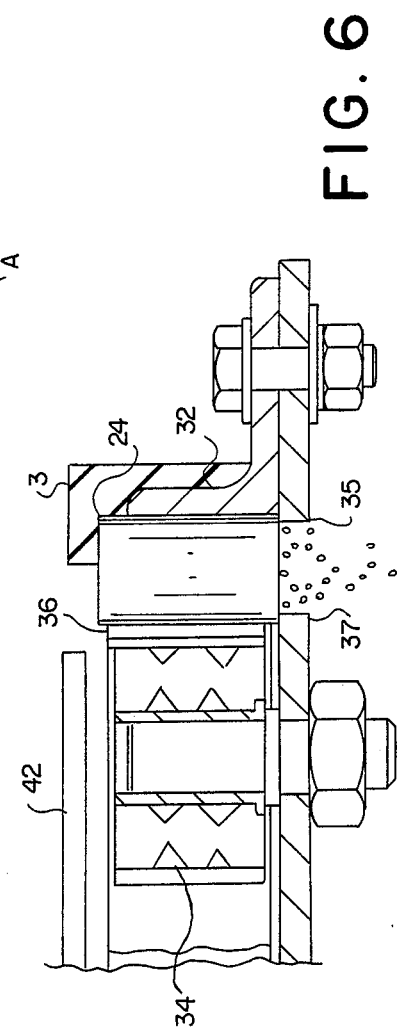
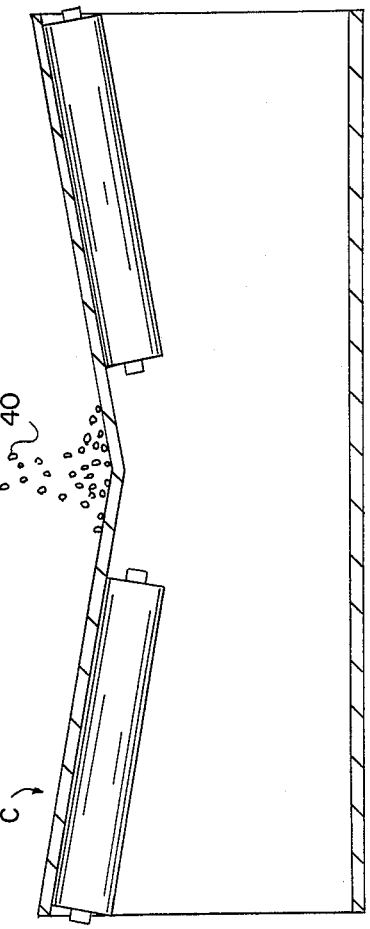
FIG. 5
FIG. 6

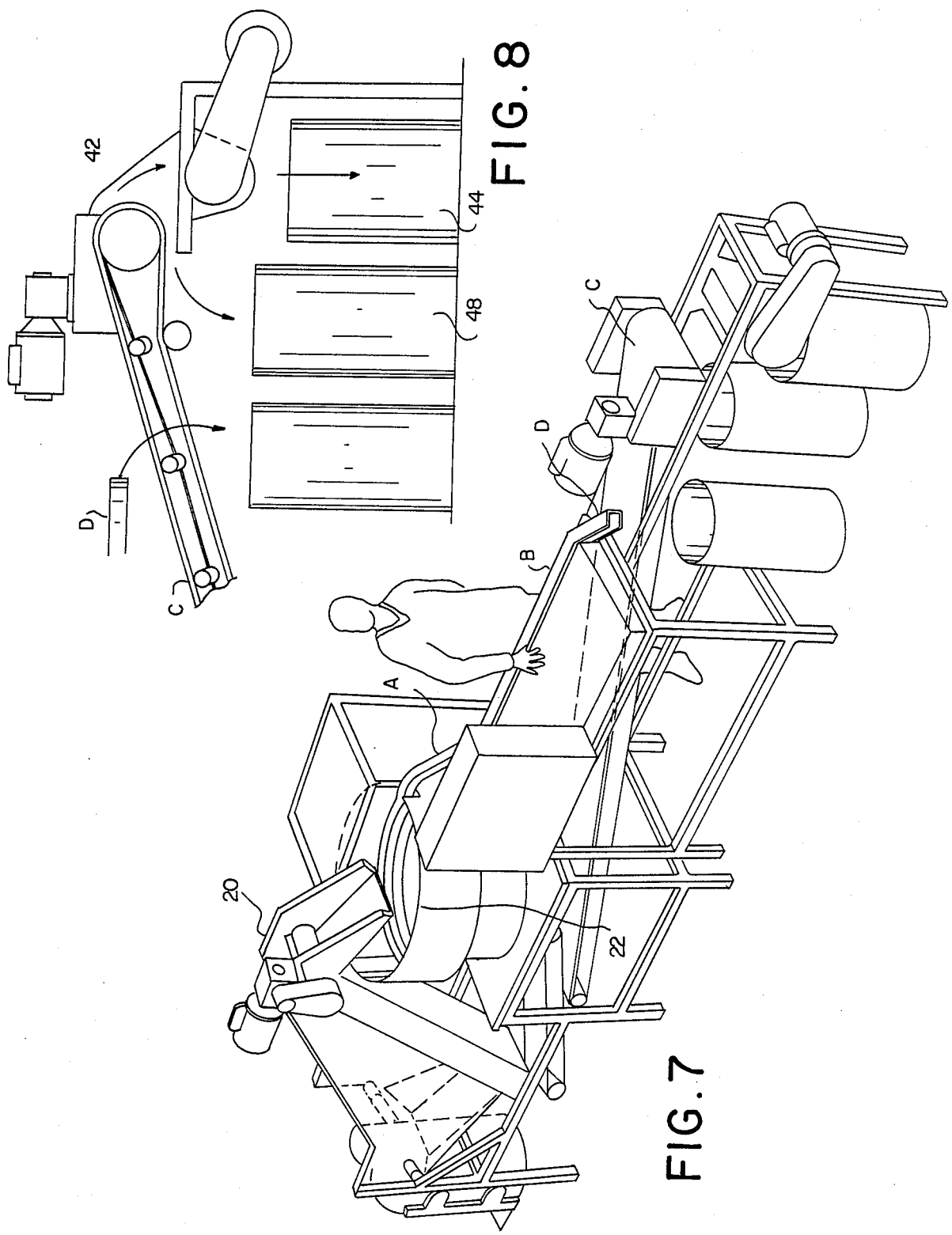

CRUSHER FOR BATTERY CATHODES

BACKGROUND OF THE INVENTION

Crushers are well known for the recycling of various material such as bottles. Rejected battery cathodes are crushed to recover encased material for reuse. This invention relates generally to the art of crushers and, more particularly, to the art of recovery of cathode material from defected battery structures. An example of relevant priority is found at U.S. Pat. No. 4,464,830.

SUMMARY OF THE INVENTION

It is an object of the present invention to provide a cathode battery crusher apparatus which crushes rejected battery cathodes and separates the crushed cathodes from the removed discharge. These as well as other objects are accomplished by a crusher for battery cathodes having a wall, a plurality of crusher heads opposite the wall, a belt carried by the crusher heads for moving battery cathodes through the crusher, a first small floor extending from a base of the wall for supporting battery cathodes on one side, a second small floor extending below the crusher heads for supporting the battery cathodes on an opposed side and opening defined between the first floor and the second floor through walls discharged from crushed battery cathodes.

BRIEF DESCRIPTION OF THE DRAWINGS

FIG. 1 is a perspective view of a battery crusher in accordance to the present invention.

FIG. 2 is a side view of the dumper of the present invention and in part illustrates a portion of the right side of FIG. 1.

FIG. 5 is a close-up view of crusher feeder A of FIG. 4.

FIG. 6 is a transverse cross-sectional view of a crusher station C along the lines 6—6 of FIG. 4.

FIG. 7 is a perspective view of the apparatus of this invention from the opposite direction of FIG. 1.

FIG. 8 is a side view of the magnetic pulley head and is an enlargement of the right side of FIG. 7.

DETAILED DESCRIPTION

Figure 3:
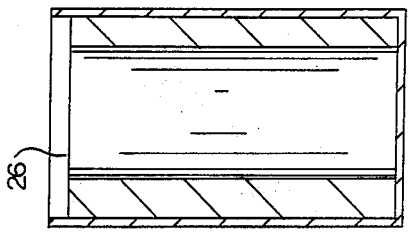
FIG. 3 is a side cross-sectional view of a rejected battery cathode in accordance with the present invention.

In accordance with this invention, it has been found that rejected battery casings having cathode material therein may be processed so as to crush and remove the cathode material for reuse thereof.

Referring more particularly to FIGS. 1 and 2 of the drawings, the apparatus 10 of the present invention includes a drum dumper 12 mounted to frame 14 for receiving drums of rejected cathodes such as drum 16 shown in FIG. 1 for pouring into feed hopper 18.

FIG. 2 best illustrates the dumping action of drum dumper 12. Feeder 20 conveys the rejected battery cathodes from feed hopper 18 into rotating picker 22. Picker 22, FIGS. 1 and 4, orients the battery cathodes into an upright position.

As is shown in FIG. 3, and as is best illustrated in FIG. 5, each rejected battery cathode 24 has an open end 26. The picker 22 sets the cathodes upright with open end 26 facing upwardly for inversion by inverter A of FIG. 5.

Inverter A comprises opposed conveying straps 28 and 30. These straps reorient the battery cathodes into a position with open end 26 facing downwardly as they convey the cathodes.

Figure 4:
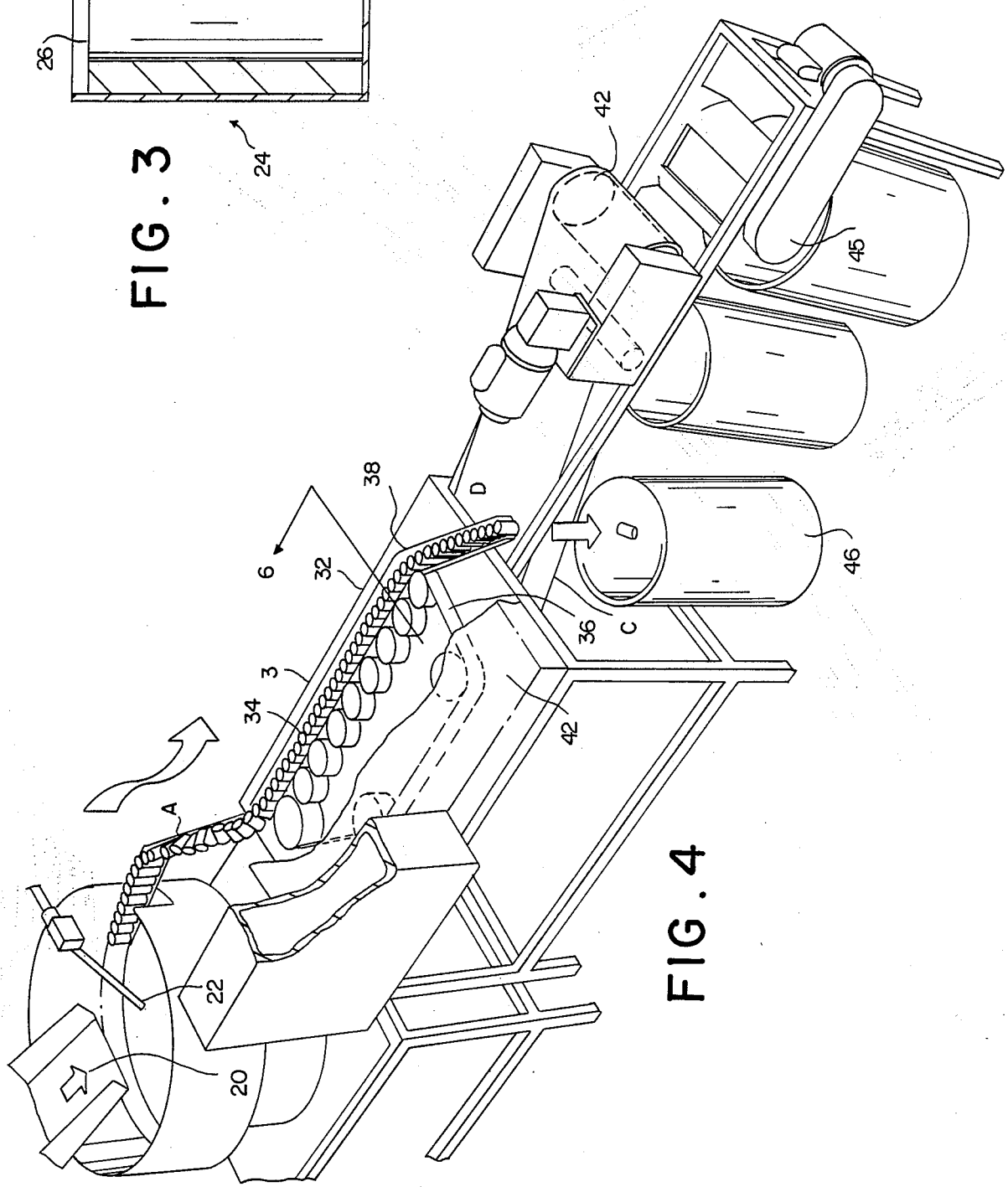
FIG. 4 is a perspective view of the battery crusher in accordance with the present invention and in part is a view of the left side of FIG. 1 from the opposite thereof.

Crusher B has wall 32 running longitudinally along one side thereof. Crusher heads 34 are opposite wall 32 at a distance less than a diameter of a single cathode from the wall. Belt 36 runs about the crusher heads conveying the cathodes through crusher path 38 (FIG. 4). Cathodes are crushed as they travel along path 38 with the space between each crusher head and the wall forming a crusher station.

FIG. 6 is a transverse cross-section view of one of these crusher stations along the line 6—6 of FIG. 4. Discharge 40 drops from the crushed cathode 24 through opening 39 defined by floors 35 and 37 which extend from a base of wall 32 and from below the crush heads 34, respectively, onto troughed conveyer C. As the open end 26 of each cathode is facing downwardly as it is crushed the force of the crush tends to force the cathode into a wedge shape with the opened lower end collapsing to a greater extent then the closed upper end. A top guide in the form of a cap 3 is provided to prevent the crushed cathode from popping up when they wedge.

Discharge 40 is conveyed along the conveyer C over magnetic head pulley 42, FIG. 8, into granulator which discharges into container 44. As is best shown in FIG. 4, crushed cathodes are carried along discharge chute D and dropped into disposal container 46. Occasionally, overcrushed cathodes fall through opening 39 defined by floors 35 and 37 onto troughed conveyer C. These overcrushed cathodes are conveyed along with discharge 40 until the discharge drops into the granulator and discharge container 44. The overcrushed cathodes, however, adhere to the conveyer as it passes about magnetic head pulley 42 and are then dropped into disposal container 48 as is best shown in FIG. 8. It is thus seen that a battery crusher is provided which crushes rejected battery cathodes and separates the crushed cathodes from the recovered discharge.

While a preferred embodiment of the invention has been described using specific terms, such description is for illustrative purposes only and it is to be understood that changes and variations may be made without departing from the spirit and scope of the following claims.

That which is claimed is:

1. A crusher apparatus for continuously transporting and crushing cathode material of rejected battery cathodes comprising:
   a wall;
   a plurality of crusher heads opposite said wall at a distance less than a diameter of a single battery cathode from said wall;
   a belt carried by said crusher heads rotating thereabout for transporting said battery cathodes past each head;
   an opening defined between a first floor extending from the base of said wall and said a second floor extending below the crusher heads to permit therethrough discharge from crushed battery cathodes to fall; and
   a top guide holding said cathode above said opening;
   a troughed conveyor beneath said crusher for receiving the discharge from said crushed battery cathodes; and
   an inverter for inverting said cathodes prior to transport to said crusher heads.

* * * * *